(12) United States Patent
    Badgley et al.

(10) Patent No.: US 8,714,215 B2
(45) Date of Patent: *May 6, 2014

(54) PROTECTIVE STRIP AND STRIP HOLDERS FOR A HANDLE

(75) Inventors: Robert J. Badgley, Orange, CA (US);
    Roger A. Roberts, Orange, CA (US)

(73) Assignee: Morgan Madison, Inc., Orange, CA (US)

( * ) Notice: Subject to any disclaimer, the term of this patent is extended or adjusted under 35 U.S.C. 154(b) by 1260 days.

This patent is subject to a terminal disclaimer.

(21) Appl. No.: 12/462,761

(22) Filed: Aug. 10, 2009

(65) Prior Publication Data
    US 2010/0236674 A1    Sep. 23, 2010

Related U.S. Application Data

(60) Provisional application No. 61/210,517, filed on Mar. 20, 2009.

(51) Int. Cl.
    *B65D 85/00* (2006.01)
(52) U.S. Cl.
    USPC ............ 150/154; 16/435; 16/111.1; 224/411; 224/277; 225/90; 280/33.992; 379/452; 379/439; 40/308

(58) Field of Classification Search
    USPC ............... 150/154; 16/435; 224/411; 225/90; 280/33.992; 379/452, 439
    See application file for complete search history.

(56) References Cited

U.S. PATENT DOCUMENTS

| | | | | |
|---|---|---|---|---|
| 4,949,377 A | * | 8/1990 | Nishina et al. | 379/452 |
| 6,868,999 B1 | * | 3/2005 | Gochanour | 225/90 |
| 7,163,211 B2 | * | 1/2007 | Alvarez | 280/33.992 |

* cited by examiner

*Primary Examiner* — Anthony Stashick
*Assistant Examiner* — Cynthia Collado
(74) *Attorney, Agent, or Firm* — Morland C. Fischer

(57) ABSTRACT

A flexible plastic strip to cover a handle such as, for example, that common to a conventional shopping cart to prevent a shopper's hands from coming into direct contact with the handle. According to a preferred embodiment, a pair of strip holders are detachably connected in surrounding engagement to the handle. The strip holders are spaced from one another and slidable along the handle. Each of the pair of strip holders has a hook projecting therefrom. The ends of the flexible strip are attached to the pair of strip holders at respective ones of the hooks thereof. The flexible strip can be removed from the strip holders and discarded in order to avoid the spread of germs, viruses and other disease-causing micro-organisms which lie on the handle.

7 Claims, 4 Drawing Sheets

US 8,714,215 B2

PROTECTIVE STRIP AND STRIP HOLDERS FOR A HANDLE

CROSS REFERENCE TO RELATED APPLICATIONS

This application is related to Provisional Application No. 61/210,517 filed Mar. 20, 2009.

BACKGROUND OF THE INVENTION

1. Field of the Invention

This invention relates to a pair of strip holders that are detachably connected to and slidable along a handle (e.g., such as that common to a grocery shopping cart) and to a disposable protective strip to be attached to and extend between the strip holders in order to cover the handle. The protective strip provides a guard that prevents direct contact between the shopper's hands and the handle so as to avoid being exposed to germs, viruses and similar disease-causing micro-organisms that lie on the surface of the handle.

2. Background Art

It is known that germs, viruses and potentially health-threatening bacteria are found on a variety of handles such as, for example, shopping cart handles, door handles, public transportation handles, faucet handles, and the like that are frequently touched by different individuals. Many viral infections remain untreatable, and the availability of effective anti-viral drugs and vaccines is somewhat limited. One manner to limit the transmission of viral infections and disease is for individuals to frequently wash their hands. However, hand washing facilities are not always readily available throughout an individual's day. Another means to reduce the spread of disease is to prevent one's hands from coming into direct contact with the handle surfaces on which such disease-causing micro-organisms lie. However, typical coverings which have been applied to these handles are known to fall off, especially in windy conditions or when the handle is subjected to vibrations and movement.

Accordingly, it would be desirable to have a reliable holder to retain an easy-to-attach and disposable, protective strip around a handle in order to prevent an individual's hands from coming into direct contact with the handle and any disease-causing micro-organisms which lie thereon.

SUMMARY OF THE INVENTION

In general terms, a disposable protective strip and a pair of strip holders are disclosed for use on a handle such as, for example, that common to a shopping cart in which groceries are carried. The pair of strip holders are detachably connected to and slidable relative to one another along the handle depending upon the length of the strip. The protective strip is attached to the strip holders so as to extend therebetween. The protective strip is preferably manufactured from a flexible (e.g., polyethylene) film by which the strip can be wrapped around and held against the handle. The protective strip functions as a guard or barrier to prevent direct contact between the shopper's hands and the handle, whereby to avoid exposure to germs, viruses and other disease-causing micro-organisms that may lie on the handle. At the conclusion of the shopping experience, the protective strip can be pulled off and removed from the pair of strip holders to be replaced by a fresh strip for use by a new shopper.

The pair of strip holders are preferably manufactured from a flexible (e.g., plastic) material. Each strip holder has a round body that is dimensioned to surround the handle. The round body has an opening located at the bottom through which the handle is moved when the strip holder is connected to or removed from the handle. A neck projects upwardly from the top of the body opposite the opening. A head extends across the neck to establish a hook below which the protective strip is retained. The protective strip has an attachment hole at each end thereof. The protective strip is attached to the pair of strip holders by inserting the hooks of the holders through respective ones of the attachment holes of the strip. The strip holders may be removed from the handle in response to an upward pushing force applied to their bodies.

DESCRIPTION OF THE PREFERRED EMBODIMENT

Figure 1:
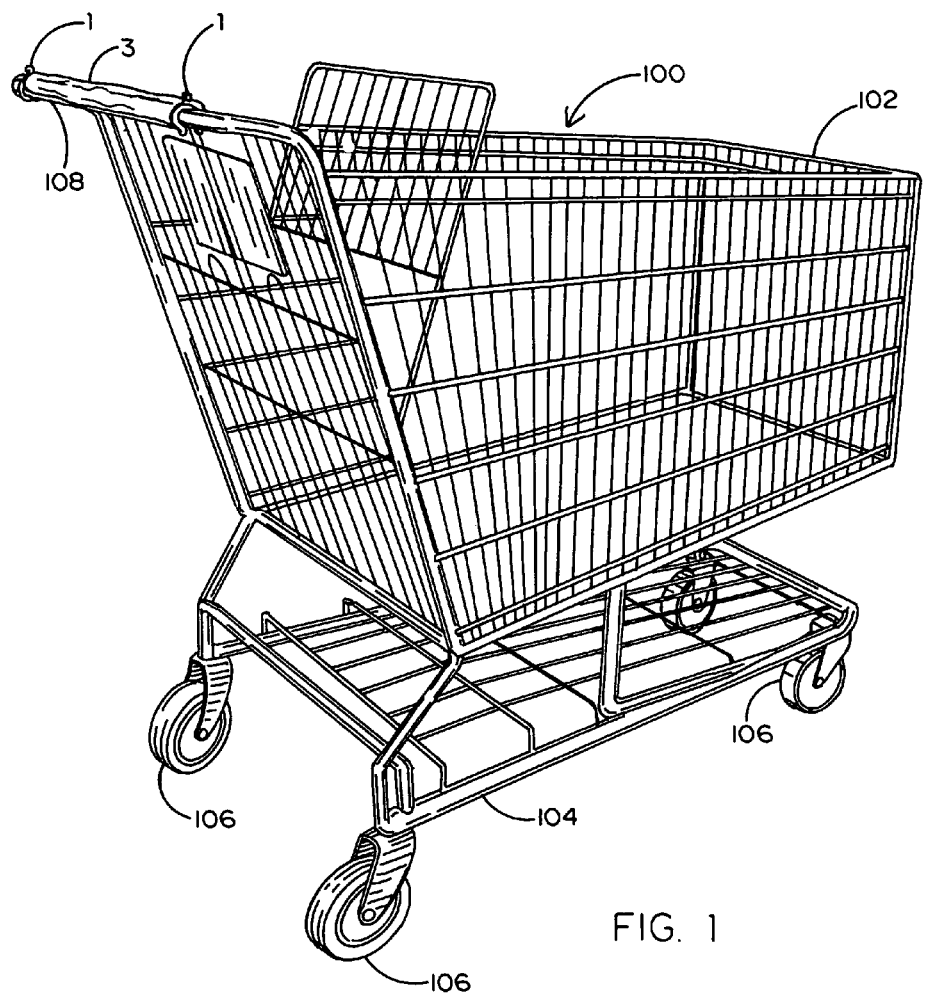
FIG. 1 shows a protective strip and a pair of strip holders being used on the handle of a shopping cart according to one preferred embodiment of this invention.

Referring initially to FIG. 1 of the drawings, there is shown a shopping cart 100 of the kind commonly found in a grocery store within which a shopper's groceries are transported. As with a conventional shopping cart, the shopping cart 100 of FIG. 1 includes a basket 102 in which the groceries are carried, a lower shelf 104 spaced below the basket 102, a set of wheels 106 lying below the lower shelf 104 to permit the cart 100 to roll from place to place, and a cylindrical handle 108 connected to the top of the basket 102 around which the shopper's hands are wrapped and to which a pulling or pushing force is applied so as to cause a corresponding force to be applied to the wheels 106.

Figure 2:
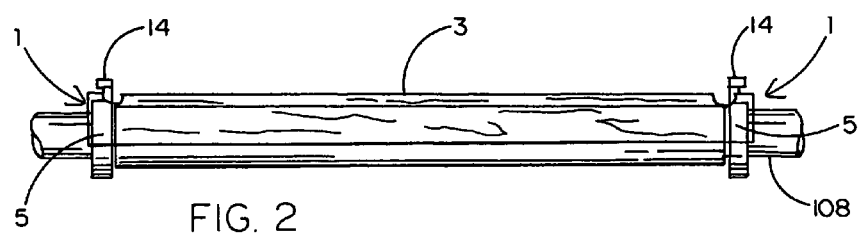
FIG. 2 is an enlarged view showing the protective strip extending between the pair of strip holders and wrapped around the handle of the shopping cart of FIG. 1.

However, unlike a conventional shopping cart, and referring now to FIG. 2 of the drawings, the handle 108 of shopping cart 100 includes a pair of strip supports or holders 1. As will be described in greater detail when referring to FIGS. 3-6 hereinafter, the strip holders 1 are detachably connected to the handle 108 and spaced from one another so as to be capable of retaining a disposable protective strip 3 around the handle 108 so that the shopper's hands can avoid direct contact with the handle. By virtue of the foregoing, the shopper's hands will not be exposed to germs, viruses and other disease-causing micro-organisms that may lie on the surface of the handle 108.

Figure 3:
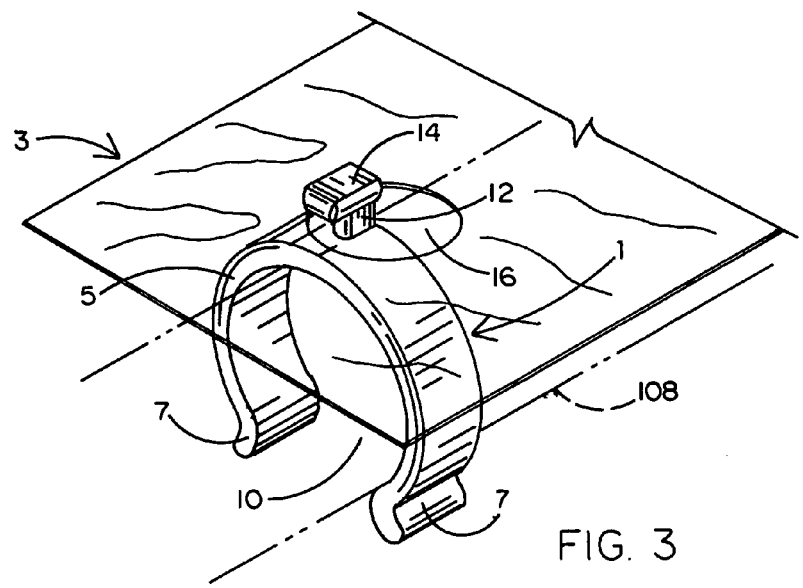
FIG. 3 is a perspective view showing one of the pair of strip holders to be detachably connected to the handle shown in FIG. 2.
Figure 4:
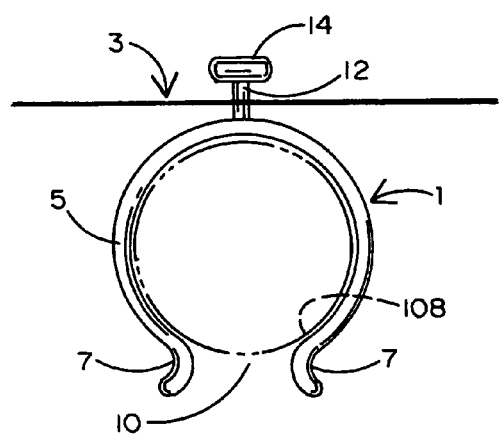
FIG. 4 is a front view of the strip holder of FIG. 3.
Figure 5:
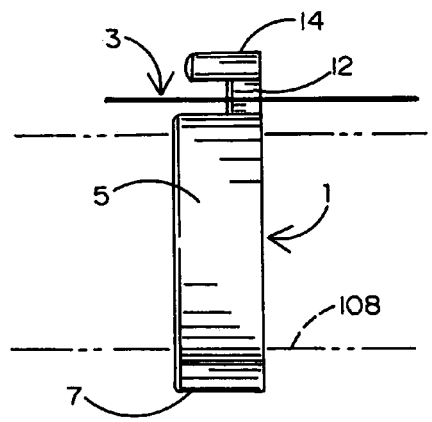
FIG. 5 is a side view of the strip holder.

Details of the strip holders 1 according to a preferred embodiment of this invention are described while referring concurrently to FIGS. 3-5 of the drawings. Inasmuch as each one of the pair is identical, only a single strip holder 1 is shown and described. The strip holder 1 is manufactured (e.g., molded) from a flexible material such as plastic, or the like, so as to have a characteristic spring memory. Strip holder 1 includes a round body 5 having an opening 10 through the bottom thereof. The length of opening 10 is preferably less than the diameter of the handle. By way of example only, the width of the round body 5 of strip holder 1 is approximately 9 mm. The diameter of the round body 5 will vary depending upon the corresponding diameter of the particular handle to which the strip holder 1 will be detachably connected. In the case where the handle 108 is a cylindrical handle 108 like that associated with the shopping cart 100 of FIG. 1, the inside diameter of the round body 5 is ideally about 20 mm. However, it is to be understood that the dimensions described above for the round body 5 of strip holder 1 are not intended to constitute a limitation of this invention. In this same regard, although a strip holder 1 having a round body 5 is preferable to accommodate a cylindrical handle, it is within the scope of this invention for the body to have other shapes (e.g., square).

The opposite ends 7 of the round body 5 between which the opening 10 is established turn outwardly and away from one another. Lying opposite the opening 10 and standing upwardly from the body 5 is a neck 12. A relatively wide head 14 is affixed to the neck 12. As is best shown in FIG. 5, the neck 12 and head 14 are arranged so that the head 14 extends across the neck 12 in perpendicular alignment, whereby to establish a hook at the top of the strip holder 1.

The pair of strip holders 1 are detachably connected to the handle 108 by pushing the round body 5 of each strip holder 1 into surrounding engagement with the handle 108 via the opening 10 between the opposite ends 7 of the body. When the handle 108 is located in the opening 10, the opposite ends 7 of the body 5 will be pushed apart, and the flexible strip holder 1 will be stressed. Once the handle 108 passes completely through the opening 10, the body 5 of strip holder 1 will snap into receipt of the handle. That is to say, the previously-stressed flexible strip holder 1 will now relax, and the spring memory thereof will cause the opposite ends 7 to automatically close and move towards one another around the handle 108. The flexible characteristic of the strip holder 1 also facilitates the ability of the body 5 to slide axially along the handle 108. Thus, the positions of the pair of strip holders 1 (best shown in FIG. 2) can be selectively adjusted relative to one another depending upon the length of handle 108 and/or the length of the disposable protective strip 3 to be attached to and extend between the strip holders 1 as will now be disclosed.

Figure 6:
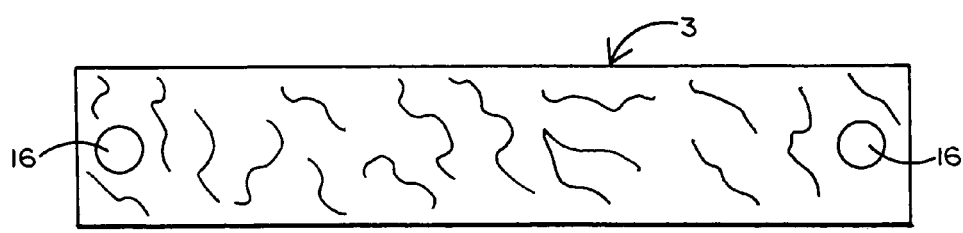
FIG. 6 is a top view of the protective strip to be attached to and extend between the pair of strip holders of FIG. 2.

Turning to FIG. 6 of the drawings, the disposable protective strip 3 is shown ready to be attached to and extend between the pair of strip holders 1 (of FIG. 2). The protective strip 3 is preferably manufactured (e.g., extruded) from a high-density, (e.g., 3 mils thick) polyethylene film that is impervious to germs, viruses and other potentially disease-causing micro-organisms. The length and width of the strip 3 will depend upon the size of the handle to be covered. In the case where the handle is that associated with the shopping cart 100 of FIG. 1, the protective strip 3 has an ideal length of about 52 cm and an ideal width of about 10 cm so as to surround the handle 108 and provide a protective barrier between the hands of the shopper and the handle. As an option, advertising indicia may be printed on the strip 3 to be displayed to shoppers.

Each end of the disposable protective strip 3 has an attachment hole 16. The attachment holes 16 are sized to accommodate therethrough the neck 12 and head 14 which stand upwardly from the round body 5 atop each strip holder 1. Because of the hook-shaped configuration of the neck 12 and head 14, the protective strip 3 will be retained below the head 14 of each strip holder 1. Accordingly, the protective strip 3 stretches between the pair of strip holders 1 so as to be held (by means of static electricity) over and against the handle (designated 108 in FIGS. 3-5) of the shopping cart and thereby create a protective guard or barrier around which the shopper's hands will be wrapped, as previously explained.

The protective strip 3 can be pulled off the pair of strip holders 1 and removed from the shopping cart handle 108 by the original shopper once shopping has been completed or by a new shopper prior to shopping. However, the pair of strip holders 1 remain detachably connected to the handles. The used protective strip 3 is then discarded to be replaced by a new strip that is attached to the strip holders 1 in the manner earlier disclosed by locating the hook shaped head 14 and neck 12 of the holder through the attachment holes 16 at the opposite ends of the new strip. When required, the strip holders 1 can be disconnected from the shopping cart handle 108 by simply pulling the strip holders 1 off the handle by applying an upward lifting force to the outwardly-turned ends 7 of the body 5 at the bottom of each holder. An upward pulling force may also be applied to the head 14 standing upwardly from the body 5. In either case, the strip holder 1 will be separated from the handle 108 by way of the opening 10 between the outwardly-turned ends 7 of the body 5.

Figure 7:
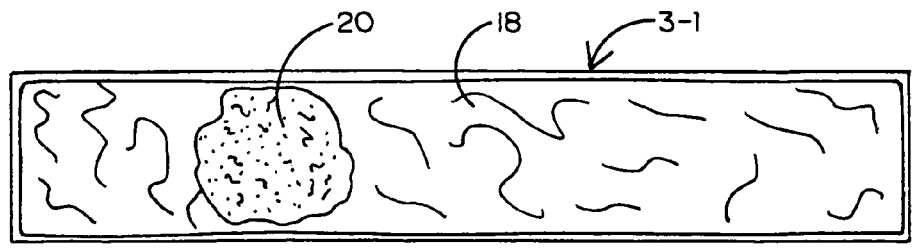
FIG. 7 is a bottom view of a protective strip according to an alternate embodiment of this invention.

In some cases, it may be desirable to attach the disposable strip to the handle without the use of the strip holders. FIG. 7 of the drawings shows a protective strip 3-1 which is devoid of the attachment holes (designated 16 in FIG. 6) through which the strip holders 1 are received to hold the strip 3 against the shopping cart handle 108. The bottom of the disposable protective strip 3-1 of FIG. 7 is coated with a suitable adhesive 18 by which strip 3-1 is attached to the handle. By way of example only, a suitable non-toxic dry adhesive for use on the strip 3-1 is that manufactured by Advanced Polymers International of Syracuse, N.Y. and known commercially as Gel-Tac 250D. The adhesive 18 can be applied so as to cover substantially the entire bottom of strip 3-1 (as shown) or as (e.g., 1½ inch) areas along each end of the strip (not shown).

It is known that the adhesive 18 with which the bottom of the strip 3-1 is coated can promote the growth of bacteria. Therefore, to maintain a germ-free surface, an anti-microbial material 20 may be mixed into the adhesive prior to its application to the bottom of the strip 3-1. By way of example only, a microbicide that is suitable to be mixed with adhesive 18 of FIG. 7 is that manufactured by Rohm & Haas Corporation and known commercially as KATHON LX 1.5%. It should be understood that the particular adhesive and anti-microbial material described above are for purposes of example and not intended to form limitations of this invention.

It is contemplated that a plurality of the disposable strips 3 and 3-1 will be attached side-by-side one another and separated by perforations. The strips may be wound up in a tight roll for transport such that one strip is torn off the roll and away from an adjacent strip along the perforations running therebetween. When the strips 3 and 3-1 are wound up in a roll, the opposing surfaces thereof will be pressed face-to-face against one another so as to remain germ free. In this case, the adhesive 18 may be applied to the bottom of the strip 3-1 of FIG. 7 without the addition of an anti-microbial material 20. Alternatively, the strips can be packaged individually one above the other. The strips may be accessed from any suitable dispenser similar to that currently used to dispense sanitary wipes or plastic produce bags.

Figure 8:
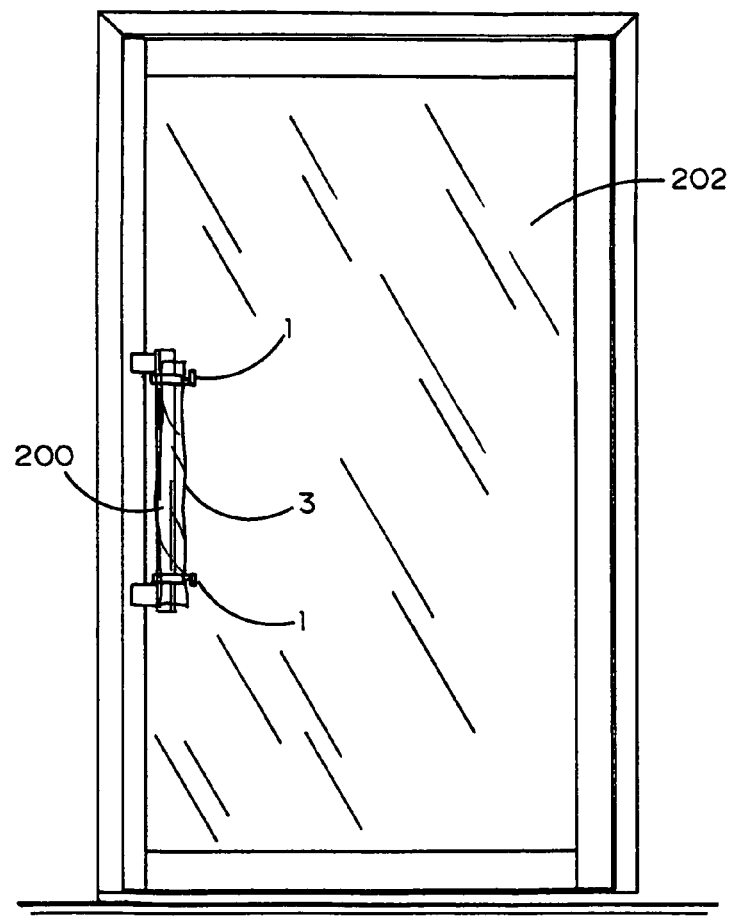
FIG. 8 shows the protective strip of FIG. 6 and the pair of strip holders being used on a door handle according to another preferred embodiment of this invention.

FIGS. 1-6 of the drawings refer to the pair of strip holders 1 detachably connected to the handle 108 of a shopping cart 100 to enable the protective strip 3 to cover the handle. However, it is to be understood that the combination strip holders 1 and protective strip 3 herein disclosed are not limited to being used on handles of shopping carts. To this end, and by way of an additional example, FIG. 8 of the drawings shows the pair of strip holders 1 detachably connected to a cylindrical handle 200 of the kind commonly found on some doors 202 to which a pulling or pushing force must be applied to open or close the door. As in the case of the shopping cart handle 108, the door handle 200 of FIG. 8 is received in surrounding engagement within the round body 5 of each one of the pair of strip holders 1, and the disposable protective strip 3 is attached to the holders so as to extend therebetween and cover the handle 200. Thus, it can be appreciated that the disposable strip 3 once again functions as a protective guard or barrier to enable the hands of an individual avoid direct contact with the door handle 200 and any germs, viruses and similar micro-organisms lying thereon.

Figure 9:
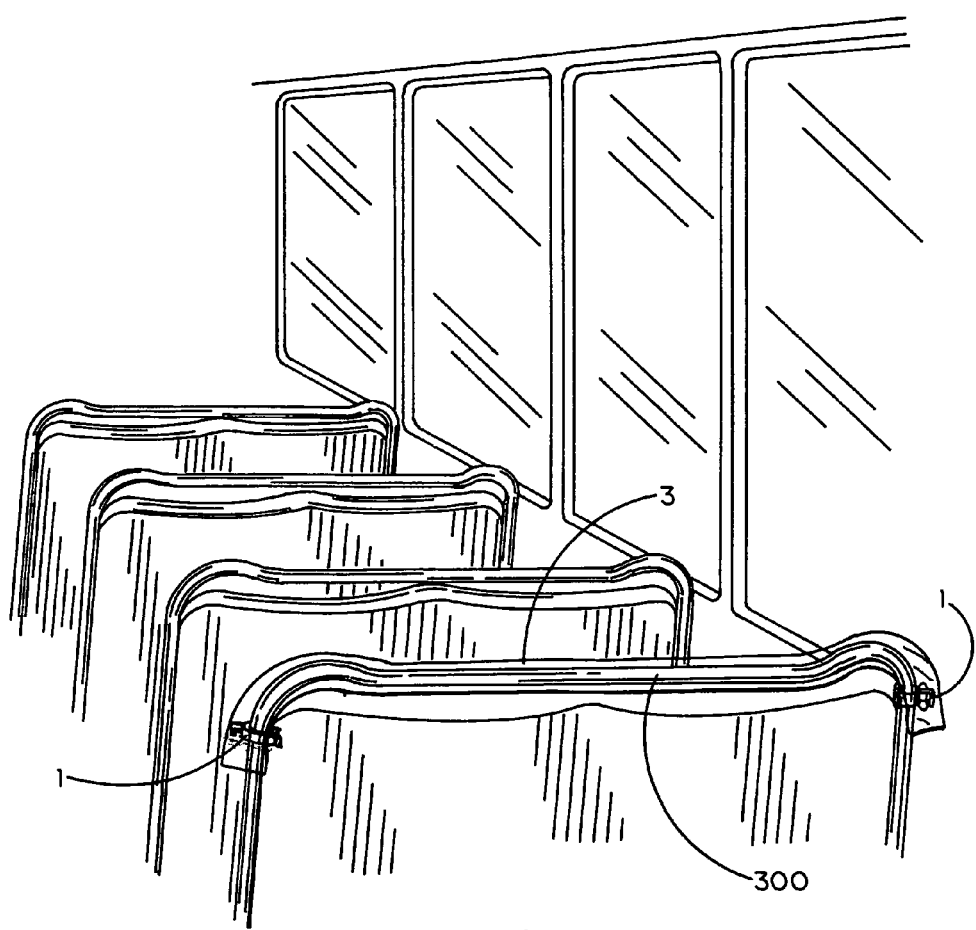
FIG. 9 shows the protective strip of FIG. 6 and pair of strip holders being used on a handle common to a public transportation vehicle according to yet another preferred embodiment of this invention.

FIG. 9 of the drawings shows another example where the pair of strip holders 1 of this invention are detachably connected to a cylindrical hand rail 300 of the kind commonly found in a public transportation vehicle, such as a bus, subway car, or the like. As in the cases of the shopping cart handle 108 and the door handle 200, the hand rail 300 of FIG. 9 is received in surrounding engagement within the round body 5 of each one of the strip holders 1. The disposable protective strip 3 is attached between the pair of holders 1 so as to cover the hand rail 300.

At the end of the day, the protective strip 3 may be pulled off the strip holders 1 which are detachably connected to the door handle 200 or the hand rail 300. The original strip is then discarded and replaced by a new protective strip 3 in the manner previously disclosed.

The invention claimed is:

1. A method for making a protective guard to cover at least some of a handle to be grasped in a hand of an individual to prevent the individual's hand from making direct touch contact with the handle, said method comprising the steps of:
   providing a material having a top surface to receive the individual's hand thereagainst and an opposite bottom surface;
   applying a mixture of adhesive and microbicide to the bottom surface of said material;
   winding the material into a roll for transport such that the top surface of the material becomes germ tree by means of the contact between said top surface of said material and the opposing bottom surface of said material to which said mixture of adhesive and microbicide is applied;
   unwinding at least some of the roll of material and separating from said material a portion thereof; and pressing the bottom surface of said portion having said mixture of adhesive and microbicide against the handle to be covered such that said portion is adhesively bonded to the handle and the top surface of said portion is germ free to establish said protective guard between the individual's hand and the handle.

2. The method recited in claim 1, including the additional steps of dividing said material into a plurality of portions; and separating said portion from said plurality thereof to be attached to said handle when the roll of material is unwound.

3. The method recited in claim 2, comprising the additional steps of dividing said material into said plurality of portions by means of forming perforations between adjacent ones of said portions; and separating said portion from said plurality thereof be tearing said portion along said perforations.

4. The method recited in claim 1, including the additional step of removing and discarding said protective guard from said handle following the individual's hand being moved out of contact with said protective guard.

5. The method recited in claim 1, including the additional step of manufacturing said material to be flexible so that the portion separated therefrom when said roll is unwound can be wrapped around the handle.

6. The method in claim 1, including the additional step of coating the bottom surface of said material with said mixture of adhesive and microbicide to form a layer therealong.

7. A method for making a protective covering to cover a contact surface to prevent a hand of an individual from making direct touch contact with the contact surface, said method comprising the steps of:
   providing a material having a top surface to receive the individual's hand thereagainst and an opposite bottom surface;
   applying a mixture of adhesive and microbicide to the bottom surface of said material;
   winding the material into a roll for transport such that the top surface of the material becomes germ free by means of the contact between the to surface of said material and the opposing bottom surface of the material to which said mixture of adhesive and microbicide is applied;
   unwinding at least some of the roll of material and separating from said material a portion thereof; and pressing the bottom surface of said portion having said mixture of adhesive and microbicide against the contact surface to be covered such that said portion is adhesively bonded to the contact surface and the top surface of said portion is germ free to establish said protective covering between the individual's hand and the contact surface.

* * * * *